Patented Aug. 7, 1928.

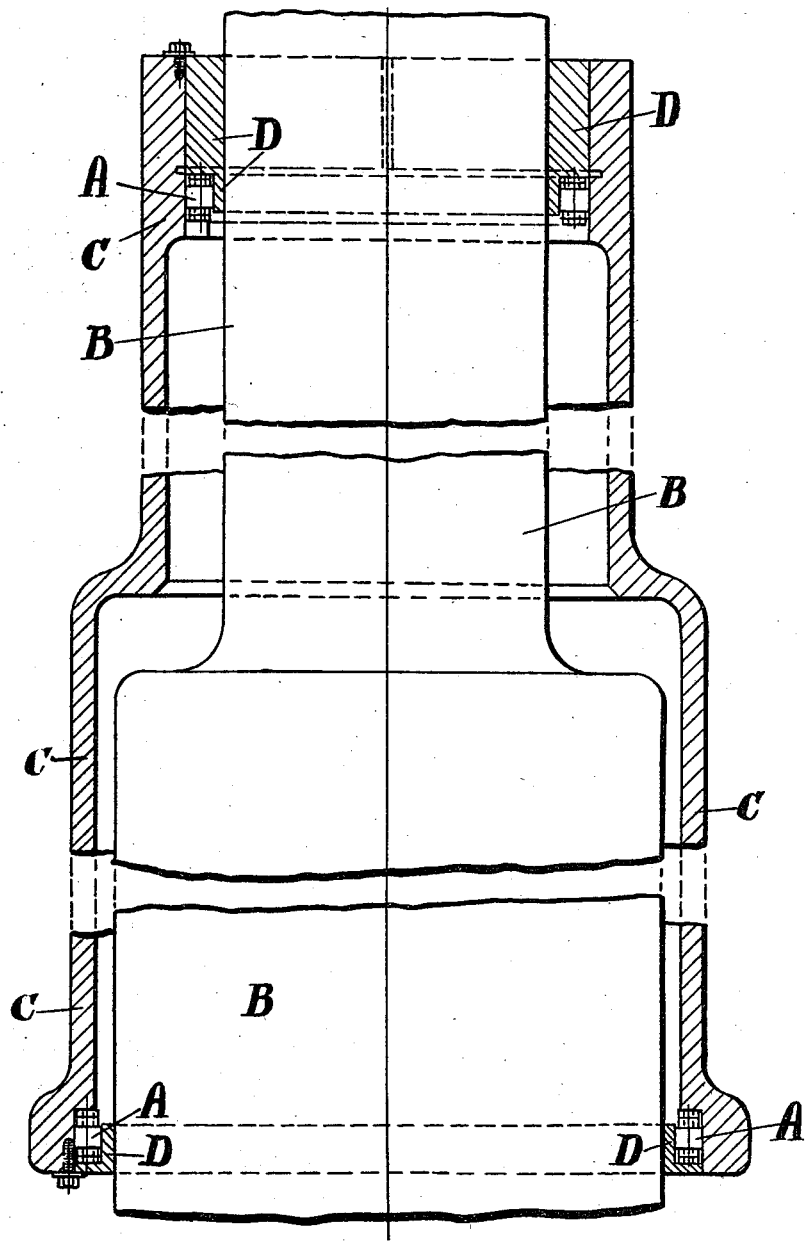

1,680,213

UNITED STATES PATENT OFFICE.

GEORGE FEATHER, OF HALIFAX, ENGLAND, ASSIGNOR TO WILLIAM ASQUITH LIMITED, OF HALIFAX, ENGLAND.

RADIAL-DRILLING MACHINE.

Application filed February 17, 1926, Serial No. 88,877, and in Great Britain February 24, 1925.

This invention relates to radial drilling machines of the kind in which the radial arm is mounted directly upon the drill pillar instead of upon a sleeve which is rotatably mounted thereon and has for its chief object to introduce where required an improved construction of antifriction bearing between the pillar and radial arm socket which is specially designed with a view to avoiding marking or otherwise detrimentally injuring the pillar due to the various movements of the arm thereon which are continually taking place when the drill is in use.

According to this invention the arm socket is fitted where required with antifriction bearings which extend partly or wholly around the pillar and are so designed as to avoid marking or otherwise detrimentally injuring the pillar.

In order that the said invention may be clearly understood and readily carried into effect, the same is described more fully with reference to the accompanying drawing which shows partly in section and partly in elevation part of a radial drilling machine provided with antifriction bearings in accordance with this invention.

In the example shown a roller chain A extends completely around the pillar B at the upper and lower portions of the arm socket C and for this purpose the said portions of the arm socket are recessed to receive the endless chains A. These chains may bear directly against the pillar B, or they may bear against rings D which make a close fit with the pillar so that although the arm socket can rise and fall thereon, the friction between the rings and the pillar will cause rotation to take place between the rings and the arm socket by way of the antifriction chains. Means are provided if necessary to cause the rollers to bear against the pillar or rings where required in order to take up friction caused by the weight of the radial arm.

In a modified construction an endless roller chain may extend around a curved bearing surface which is made concentric with the pillar. This curved bearing surface is formed in a piece with or attached to a cap which is adjustably secured to the arm socket so that it can be adjusted to cause the rollers to take up the side thrust that the arm socket exerts on the pillar or it may be made separate from the cap and be adjusted by set screws therein, or on the arm socket. Two of the bearings so formed are arranged at opposite sides of the arm socket in the best position for neutralizing the friction that is caused by the weight of the arm, namely the lower bearing surface at the front of the arm socket and the upper bearing surface at the back of the arm socket. Rings such as D may be used in conjunction with these bearings.

What I claim as my invention and desire to secure by Letters Patent in the United States is:—

In a radial drilling machine, a pillar, two independent rings fitted frictionally on the pillar at vertically spaced points and movable vertically on the pillar, an arm socket surrounding said pillar, said rings being located within the end portions of said socket, said rings and socket being movable vertically as a unit, and anti-frictional bearings between said socket and rings to permit the socket to rotate freely around said rings.

In testimony whereof I affix my signature.

G. FEATHER.